Dec. 2, 1924.

W. HARTENSTEIN 1,517,559

BEET HARVESTER

Filed Aug. 27, 1921    3 Sheets-Sheet 1

Fig. I.

Inventor
W. Hartenstein
by C. P. Goepel
Attorney.

Patented Dec. 2, 1924.

1,517,559

UNITED STATES PATENT OFFICE.

WILLY HARTENSTEIN, OF DARMSTADT, GERMANY, ASSIGNOR TO JOSEPHINE AMAN, OF RUTHERFORD, NEW JERSEY.

BEET HARVESTER.

Application filed August 27, 1921. Serial No. 495,926.

*To all whom it may concern:*

Be it known that I, WILLY HARTENSTEIN, a citizen of the German Republic, and resident of Darmstadt, Germany, have invented certain new and useful Improvements in Beet Harvesters, of which the following is a specification.

The present invention relates to improvements in beet harvesters, and more particularly refers to a machine adapted for the harvesting of beets, turnips or the like in which is involved the operation of lifting the beets out of the soil.

An object of the invention resides in providing in rear of the excavating plows a fork lifting device for the beets adapted to be put in motion upon movement of the machine and to derive its actuation from the ground wheels upon which the harvester framework is supported.

With the foregoing and other objects in view, the invention will be more fully described hereinafter, and will be more particularly pointed out in the claims appended hereto.

In the drawings, wherein like symbols refer to like or corresponding parts throughout the several views, Fig. 1 is a view in side elevation of an improved beet harvester constructed according to the present invention;

Figure 1:
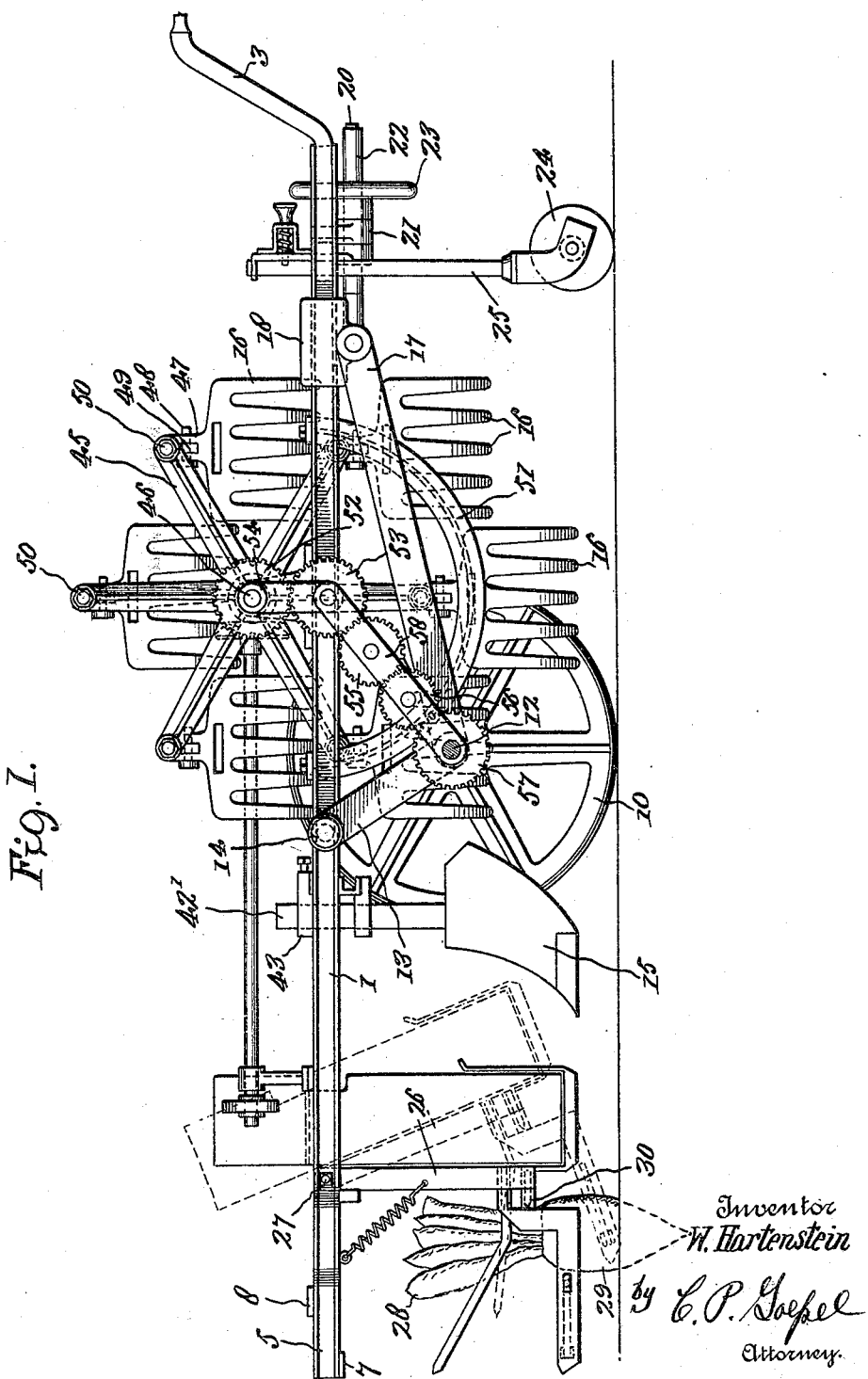

Referring more particularly to the drawings, 1 and 2 designate parallel side rails of the main framework of the machine to which may be connected at the rear handles 3 and 4, such rails being made to converge at their front ends and provided with parallel, closely situated extremities 5 and 6 connected by cross bars 7 and 8. The framework is suitably strengthened by cross braces at appropriate points and is supported upon the ground wheels 9 and 10 having the stub axles 11 and 12. These axles are pivotally coupled at their inner ends to links 13 which in turn are pivoted at 14 to the side rails 1 and 2 respectively.

The wheels 9 and 10 are intended to swing upon the links 13 in order that the framework may be raised and lowered as required to gage the depths of the excavating plows 15 and the pairs of lifting forks 16 hereinafter referred to in further detail. For the purpose of executing a pivotal movement of the ground wheels about the centers 14, further links 17 are pivoted to the axles 11 and 12 and to cross heads or sliding members 18 fitted upon the beams 1 and 2 and connected as shown more particularly in Fig. 2 by a shaft 19. This shaft 19 is coupled to a worm shaft 20 extending centrally of the machine and longitudinally thereof and passing through suitable hangers 21 depending from a beam 22' which extends transversely of the machine and is supported by the side rails 1 and 2.

A sleeve 22 is mounted upon the worm shaft 20 and is rotated by means of a hand wheel 23. The sleeve 22 and hand wheel 23 are restrained against an axial travel but may rotate freely in either direction to cause the feeding of the worm shaft 20 either forwardly or rearwardly. This movement in the worm shaft 20 is attended by a corresponding shifting of the crossing shaft 19 and the cross heads 18 and consequently the links 17 are caused to swing the wheels 10 and the links 13 about the pivot centers 14.

The wheels 24 at the rear portion of the framework are casters and are carried upon the standards 25 which have a swiveling movement in the harvester framework. These casters however form no particular part of the invention.

At the forward portion of the machine are mounted a pair of arms 26 which depend from pivotal connections 27 had with the rails 1 and 2. A topping knife 30 is carried transversely by the lower portions of the arms 26 at such an elevation as to come between the top 28 and the body 29 of a beet such as shown in Fig. 1. The knife 30 is intended to sever the leaves or top portion 28 from the body 29 of the beet, and inasmuch as the line of cleavage varies as to elevation the knife 30 is pivotally supported through the arms 26 in order that it may accommodate itself to the desired horizontal position and thus come correctly to a point where it may behead the beet with as little loss of the body portion as practicable.

Figure 2:
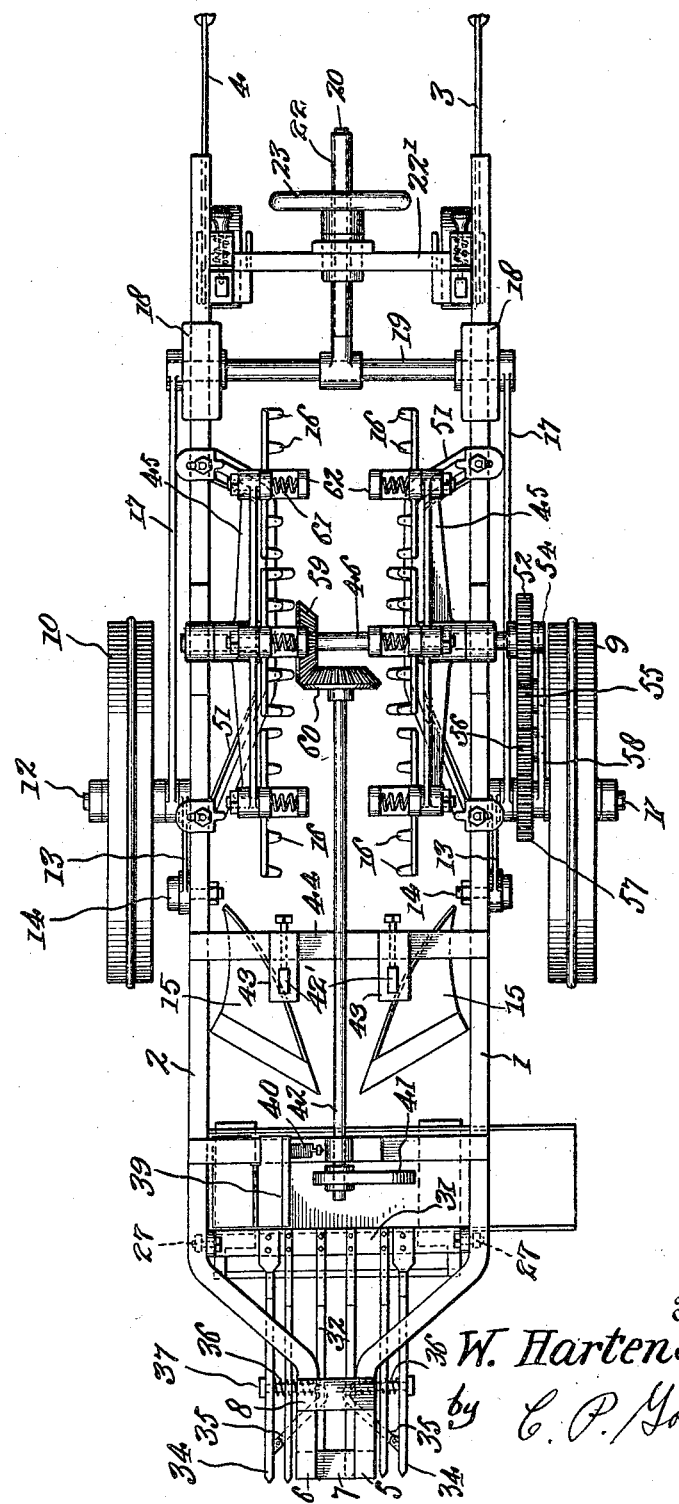
Fig. 2 is a top plan view thereof.

In rear of the topping knife and its appurtenant parts are the shovels 15, being two in number as indicated in Fig. 2, and supported by the stocks 42′ held in clamps 43 which are sustained by a transverse beam 44. The clamps 43 admit of an adjustment of the plows 15 as to height and such clamps may also be adjustable laterally upon the beam 44 in order to vary the gap between the plows to agree with the root conditions of the beets or the size of the vegetables.

Figure 3:
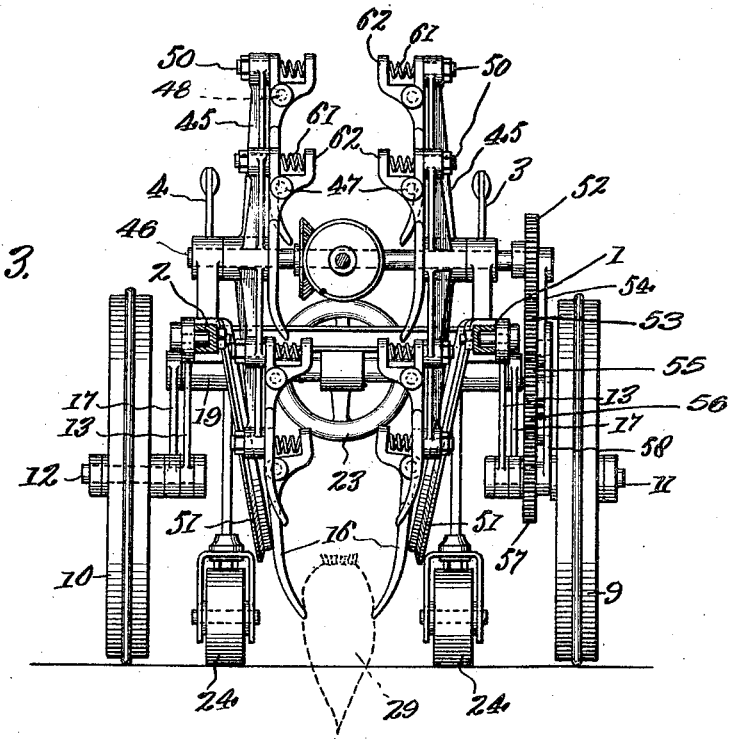
Fig. 3 is a cross sectional view taken through the machine.
Figure 4:
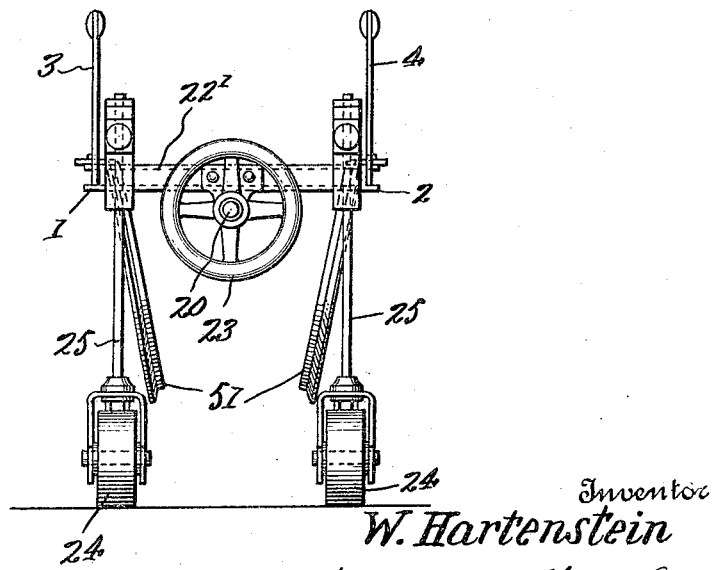
Fig. 4 is a rear end view with certain of the parts left out for clearness.

These shovels are intended to sever the roots of the beets and to put them in condition to be lifted from the soil by the action of the forks 16 which follow. These forks 16 are carried upon the arms 45 of two spiders which are situated apart and journaled in common upon a transverse shaft 46 journaled upon suitable bearings mounted upon the side rails 1 and 2. The forks 16 are bifurcated at their upper ends as indicated at 47 to receive longitudinally extending pins 48 which connect them with tongues 49 depending from bolts 50 which lie transversely and pivotally support the tongues 49 in the outer ends of the spider arms 45. The forks 16 thus have a transversely swinging movement about the pins 48 and a longitudinally swinging motion about the bolts 50. The transverse swinging movement enables the forks 16 to approach one another upon the beet at the lower portions of their movement, for instance, as shown in Fig. 3, while the pins 50 allow the forks 16 to always assume a depending position with respect to the arms 45.

The forks 16 are made to approach one another by cam segments 51 mounted upon the rails 1 and 2 and having a suitable inclination appropriate to swing the forks 16 a desired distance. The forks 16 are provided with a suitable number of tines, preferably five, and they are formed concave on their inner faces, as indicated in Fig. 3, so that the lower extremities of the tines may project suitably to engage the body portion of the beet.

The shaft 46 carries at one end the gear wheel 52 meshing with the gear wheel 53. A link 54 on the shaft 46 carries the gear wheel 53 for pivotal movement about the periphery of the gear wheel 52. Two other gear wheels 55 and 56 are interposed between the gear wheel 53 and an initial gear wheel 57 upon the stub axle 11 of the ground wheel 9. A link 58 connects the four gear wheels 53, 55, 56 and 57 and supports the intermediate gear wheels 55 and 56 and has a pivotal connection with the lower portion of the link 54.

In operation, the machine is either drawn along by draft animals or by a tractor.

The machine moves along until the shovels 15 come into contact with the beet body or the soil thereabout, cutting the roots and lifting the beet partially. Subsequently, a pair of the forks 16 close about the body portion 29 of the beet, as best shown in Fig. 3, when, by reason of the rotation of the forks to a lower position, they encounter the cam segments 51. Upon further rotation in a counterclockwise direction as looked at from Fig. 1, which is the direction of the wheels 9 and 10, brought about by the arrangement of the gearing shown, the beet bodies are lifted suitably from the ground to insure their severance from the roots and from the soil.

After the beet and the forks 16 holding the same reach a predetermined elevation above the influence of the cam segments 51, springs 61 interposed between the spider arms and offset end 62 of the forks act to return the forks to an initial position where they swing away from the beet above or outwardly away from each other. Thus releasing their grasp upon the beet, the latter will drop to the ground. The beets may be subsequently picked by hand or a machine.

From time to time as the character of the soil or a different variety of beet makes it necessity, the ground wheels 9 and 10 are adjusted so as to raise or lower the main frame together with the plows 15 and the forks 16, as also the topping knife 30. It is well known to those in this art that edible beets have a larger diameter than sugar beets, and consequently the plows 15 will have to be set farther apart when operating upon the former and it will not be necessary to swing the forks 16 so closely together as desirable when harvesting sugar beets. For this purpose cam segments 51 of a suitable gage and pitch are selected to cause the movement of the forks 16 together to a corresponding degree.

The hand wheel 23 may be resorted to from time to time to cause a swinging of the ground wheels about the main framework and a commensurate raising and lowering of the framework and the plows, forks and other parts carried thereby.

It will be appreciated from the foregoing that the present invention provides an improved harvester for beets, turnips or the like in which the three-fold operation of topping, excavating, and lifting the beets is accomplished by mechanisms included in a compact machine.

It is obvious that various changes and modifications may be made in the details of construction and design of the above specifically described embodiment of this invention without departing from the spirit thereof, such changes and modifications being restricted only by the scope of the following claims.

What is claimed is:—

1. In a harvester, a frame, rotating spiders thereon, forks having a pivotal movement both longitudinally and transversely with respect to the spiders, means to rotate the spiders, spring means to tend to separate the forks, and cam curved rails on the frame adapted to direct the forks together as they approach the ground.

2. In a beet harvester, the combination of a framework, and lifting means thereon comprising a pair of rotary spiders spaced apart and driven by movement derived from the progress of the machine, and longitudinally and laterally shiftable forks carried by said spiders, with means to cause the forks to approach one another at the lower portions of their travel.

3. In a harvester for beets or the like, a frame, lifting means for the frame comprising pairs of forks arranged to grasp the beet from opposite sides, means to force the forks toward one another at the lower portions of their movement, and resilient means to return them to an initial position farther apart at the upper portion of their movement to release the beet.

4. A harvester for beets and the like comprising a frame, two sets of forks thereon revolving in the direction of motion of the frame and having both a lateral and a longitudinal oscillating motion, means to revolve the forks as the machine proceeds, and means to cause the forks of one set to approach the forks of the companion set at one point of the revolving movement.

In testimony, that I claim the foregoing as my invention, I have signed my name.

Dr. Ing. WILLY HARTENSTEIN.